US012401964B2

(12) United States Patent
Tse

(10) Patent No.: US 12,401,964 B2
(45) Date of Patent: *Aug. 26, 2025

(54) METHODS AND SYSTEMS FOR OPTIMIZING BEHAVIOR OF AUTOMOTIVE AUDIO PLAYBACK SYSTEMS

(71) Applicant: Ex Machina Soundworks, LLC, Brooklyn, NY (US)

(72) Inventor: William Tse, Flushing, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/941,947

(22) Filed: Nov. 8, 2024

(65) Prior Publication Data

US 2025/0071504 A1 Feb. 27, 2025

Related U.S. Application Data

(63) Continuation-in-part of application No. 18/616,732, filed on Mar. 26, 2024, now Pat. No. 12,170,886.

(Continued)

(51) Int. Cl.
*H04S 7/00* (2006.01)
*H04R 1/10* (2006.01)

(Continued)

(52) U.S. Cl.
CPC .............. *H04S 7/307* (2013.01); *H04S 1/007* (2013.01); *H04S 7/302* (2013.01); *H04S 2400/01* (2013.01); *H04S 2400/11* (2013.01)

(58) Field of Classification Search
None
See application file for complete search history.

(56) References Cited

U.S. PATENT DOCUMENTS

2002/0196947 A1 12/2002 Lapicque
2004/0264706 A1 12/2004 Ray (Continued)

FOREIGN PATENT DOCUMENTS

JP 2002135898 A 5/2002

OTHER PUBLICATIONS

International Search Report and Written Opinion issued in App. No. PCT/US2024/21446, dated Jul. 11, 2024, 9 pages.

(Continued)

*Primary Examiner* — Qin Zhu
(74) *Attorney, Agent, or Firm* — Blueshift IP, LLC; Cynthia M. Gilbert

(57) ABSTRACT

A method for perceptual rendering of audio for playback by at least one speaker in an automotive audio playback system includes optimizing a first finite impulse response (FIR) filter associated with a first channel of audio input of audio associated with a source, for application to a first speaker in an automotive audio playback system for output by a first transducer of the first speaker. The method includes optimizing a second finite impulse response (FIR) filter associated with a second channel of audio input of the audio associated with the source, for application to a second speaker in the automotive audio playback system for output by at least one transducer of the second speaker, wherein optimizing the second FIR filter further comprises modifying the second FIR filter to include at least one coefficient defined based upon a relationship between the first transducer and a second transducer.

16 Claims, 5 Drawing Sheets

Related U.S. Application Data

(60) Provisional application No. 63/454,841, filed on Mar. 27, 2023.

(51) Int. Cl.

| | |
|---|---|
| ***H04R 29/00*** | (2006.01) |
| ***H04R 31/00*** | (2006.01) |
| ***H04S 1/00*** | (2006.01) |

(56) References Cited

U.S. PATENT DOCUMENTS

| | | | | |
|---|---|---|---|---|
| 2006/0218214 | A1* | 9/2006 | Ohashi ..................... | H04B 3/23<br>708/300 |
| 2009/0262947 | A1 | 10/2009 | Karlsson | |
| 2013/0089209 | A1 | 4/2013 | Okimoto | |
| 2014/0064526 | A1 | 3/2014 | Otto | |
| 2022/0322025 | A1 | 10/2022 | Claar | |
| 2024/0334151 | A1 | 10/2024 | Tse | |

OTHER PUBLICATIONS

Notice of Allowance dated Aug. 12, 2024 for U.S. Appl. No. 18/616,732 (pp. 1-5).
Office Action dated May 21, 2024 for U.S. Appl. No. 18/616,732 (pp. 1-9).

* cited by examiner

METHODS AND SYSTEMS FOR OPTIMIZING BEHAVIOR OF AUTOMOTIVE AUDIO PLAYBACK SYSTEMS

CROSS-REFERENCE TO RELATED APPLICATIONS

This application is a continuation-in-part of U.S. patent application Ser. No. 18/616,732, filed on Mar. 26, 2024, entitled “Methods and Systems for Optimizing Behavior of Audio Playback Systems,” which itself claims priority from U.S. Provisional Patent Application Ser. No. 63/454,841, filed on Mar. 27, 2023, entitled “Methods and Systems for Optimizing Behavior of Audio Playback Systems,” each of which is hereby incorporated by reference.

BACKGROUND

The disclosure relates to methods for optimizing behavior of automative audio playback systems. More particularly, the methods and systems described herein relate to functionality for independently optimizing linear behavior from non-linear behavior in automotive loudspeaker systems. The methods and systems described herein may further relate to functionality for optimizing and applying filters to provide optimized perceptual rendering of audio for playback by headphones.

In the conventional design process for loudspeaker systems, the linear and non-linear characteristics of the system are considered together and often improving one aspect comes at the cost of reduced performance in another.

Conventional systems for audio playback do not optimize the perceptual rendering of audio output by headphones or other playback systems, resulting in a suboptimal listening experience, whether of music or sound associated with visual media, such as film or television content. Therefore, there is a need for a technical solution that recreates the experience of sound coming from an arbitrary collection of sources at arbitrary locations, including for playback of audio from stereo speakers.

BRIEF SUMMARY

In one aspect, a method for perceptual rendering of audio for playback by at least one speaker in an automotive audio playback system includes optimizing a first finite impulse response (FIR) filter associated with a first channel of audio input of audio associated with a source, for application to a first speaker in an automotive audio playback system for output by a first transducer of the first speaker. The method includes optimizing a second finite impulse response (FIR) filter associated with a second channel of audio input of the audio associated with the source, for application to a second speaker in the automotive audio playback system for output by at least one transducer of the second speaker, wherein optimizing the second FIR filter further comprises modifying the second FIR filter to include at least one coefficient defined based upon a relationship between the first transducer and a second transducer.

In another aspect, a method for perceptual rendering of audio for playback by a headphone includes optimizing a first finite impulse response (FIR) filter associated with a first channel of audio input of audio associated with a source, for application to a first transducer of a headphone for output. The method includes optimizing a second FIR filter associated with a second channel of audio input of the audio associated with the source, for application to a second transducer of the headphone for output, wherein optimizing the second FIR filter further comprises modifying the second FIR filter to include at least one coefficient defined based upon a relationship between the first transducer and a second transducer.

In still another aspect, a method for perceptual rendering of audio for playback by a playback speaker system includes optimizing a first finite impulse response (FIR) filter associated with a first channel of audio input of audio associated with a source, for application to a first speaker in a playback speaker system for output by a first transducer of the first speaker. The method includes optimizing a second finite impulse response (FIR) filter associated with a second channel of audio input of the audio associated with the source, for application to a second speaker in the playback speaker for output by at least one transducer of the second speaker, wherein optimizing the second FIR Filter further comprises modifying the second FIR filter to include at least one coefficient defined based upon a relationship between the first transducer and a second transducer.

In yet another aspect, a method for independently optimizing linear components from non-linear components in loudspeaker design includes receiving an identification of at least one design specification for a non-linear component of a loudspeaker system. The method includes defining at least one characteristic of at least one hardware component of the loudspeaker system satisfying the received identification. The method includes optimizing at least one linear component of a loudspeaker system, wherein optimizing further comprises optimizing a finite impulse response (FIR) filter of the loudspeaker system, and wherein, combined with application of the optimized FIR filter execution of the loudspeaker system including the selected non-linear components, satisfies a threshold level of performance of the loudspeaker system.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
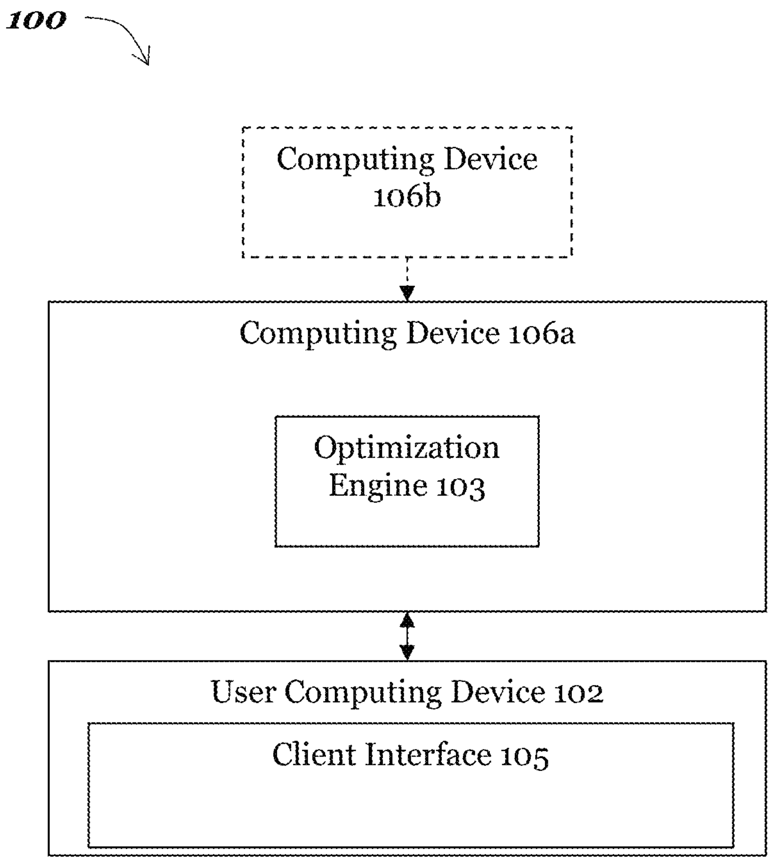
FIG. 1A is a block diagram depicting an embodiment of a system for independently optimizing linear components from non-linear components in loudspeaker design.

Referring now to FIG. 1, a block diagram depicts one embodiment of a system for independently optimizing linear behavior from non-linear behavior in loudspeaker systems. In brief overview, the system 100 includes a computing device 106*a* in communication with a user computing device 102 and, optionally, in communication with a computing device 106*b*. The computing device 106*a* may execute an optimization engine 103. The user computing device 102 may execute a client interface 105. The computing device 106*a* may transmit data specifying an optimized design for a loudspeaker system including one or more loudspeakers to an optional computing device 106*b* associated with a manufacturer of loudspeakers. By generating a design specification for use in manufacturing an optimized loudspeaker, the methods and systems described herein provide a technical solution to the problem of optimizing linear behavior of a loudspeaker system separately from non-linear behavior of the loudspeaker system in order to create a loudspeaker system that incorporates one or more design requirements without compromising performance regarding either linear or non-linear behaviors. The system 100 may include functionality for executing an empirical step (e.g., determining one or more measurements of behavior in a loudspeaker system), functionality for executing an optimization step, and functionality for directing the deployment of the optimized system.

The optimization engine 103 may be provided as a software component. The optimization engine 103 may be provided as a hardware component. The computing device 106*a* may execute the optimization engine 103.

Although, for ease of discussion, the optimization engine 103 and the client interface 105 are described in FIG. 1 as separate modules, it should be understood that this does not restrict the architecture to a particular implementation. For instance, these components may be encompassed by a single circuit or software function or, alternatively, distributed across a plurality of computing devices.

As used herein, linear behaviors include components of behavior that can be extracted from impulse response measurement or that can contribute to a measurement of an impulse response (e.g., measured magnitude response and timing behavior); such components may be power-invariant. Linear behavior may be controlled by software. Non-linear characteristics may include, without limitation distortion and dispersion. Such methods and systems as described herein may free a loudspeaker system designer to consider only the power-dependent components of a design (including, without limitation, distortion and dispersion); these may be controlled by hardware design.

Using digital signal processing to correct the linear behavior of a loudspeaker system allows for the optimization of non-linear characteristics in the physical design of the loudspeaker and its components without sacrificing the linear performance in the finished system. The linearization may be deployed as a finite impulse response (FIR) filter on a digital signal processor within the loudspeaker system. The optimized coefficients of the FIR filter may be derived as described in connection with FIG. 2 below.

Figure 2:
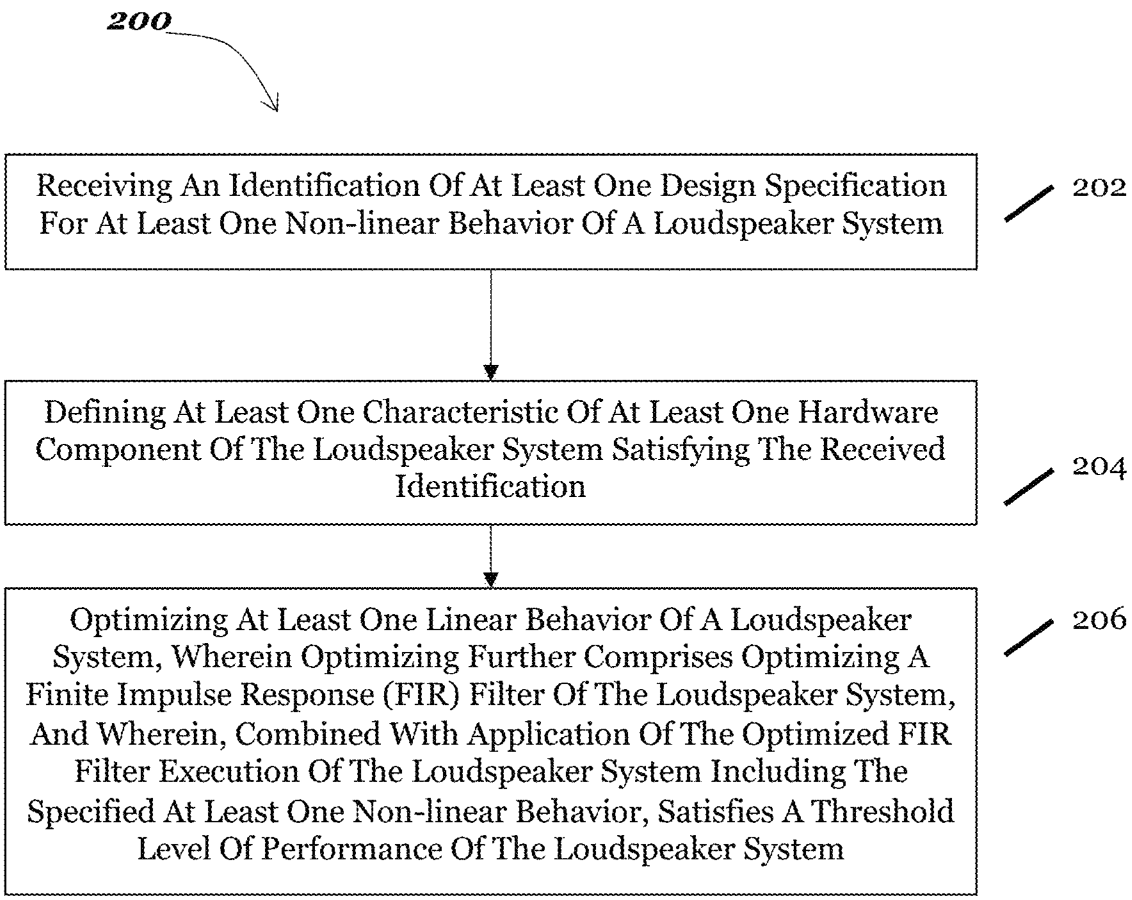
FIG. 2 is a flow diagram depicting an embodiment of a method for independently optimizing linear components from non-linear components in loudspeaker design.

Referring now to FIG. 2, in brief overview, a flow diagram depicts one embodiment of a method 200 for independently optimizing linear behavior from non-linear behavior in loudspeaker design. The method 200 includes receiving an identification of at least one design specification for a non-linear behavior of a loudspeaker system (202). The method 200 includes defining at least one characteristic of at least one hardware component of the loudspeaker system satisfying the received identification (204). The method 200 includes optimizing at least one linear behavior of a loudspeaker system, wherein optimizing further comprises optimizing a FIR filter of the loudspeaker system, and wherein, combined with application of the optimized FIR filter, execution of the loudspeaker system including the specified non-linear behaviors satisfies a threshold level of performance of the loudspeaker system (206). Furthermore, execution of the loudspeaker system designed to include the at least one hardware component having the at least one defined characteristic, in combination with application of the optimized FIR filter, satisfies the threshold level of performance of the loudspeaker system.

Referring now to FIG. 2, in greater detail and in connection with FIG. 1, the method 200 includes receiving an identification of at least one design specification for a non-linear behavior of a loudspeaker system (202). The optimization engine 103 may receive the identification of the at least one design specification from the user computing device 102. Alternatively, or in addition, the optimization engine 103 may provide a user interface displayed on the computing device 106*a* for directly receiving one or more design specifications.

A design specification may include a specification of a threshold level of performance of the loudspeaker for each of one or more components in the loudspeaker. The computing device 106*a* may provide an enumeration of one or more components in a loudspeaker system and, for each component in the enumeration, the computing device 106*a* may provide one or more attributes of the loudspeaker system that a user may associate with a threshold level of performance and for which the user may specify a threshold level of performance. The computing device 106*a* may use one or more received design specifications to automatically (e.g., without human intervention) assign threshold levels of performance for other attributes not addressed by the received design specifications.

Figure 1B:
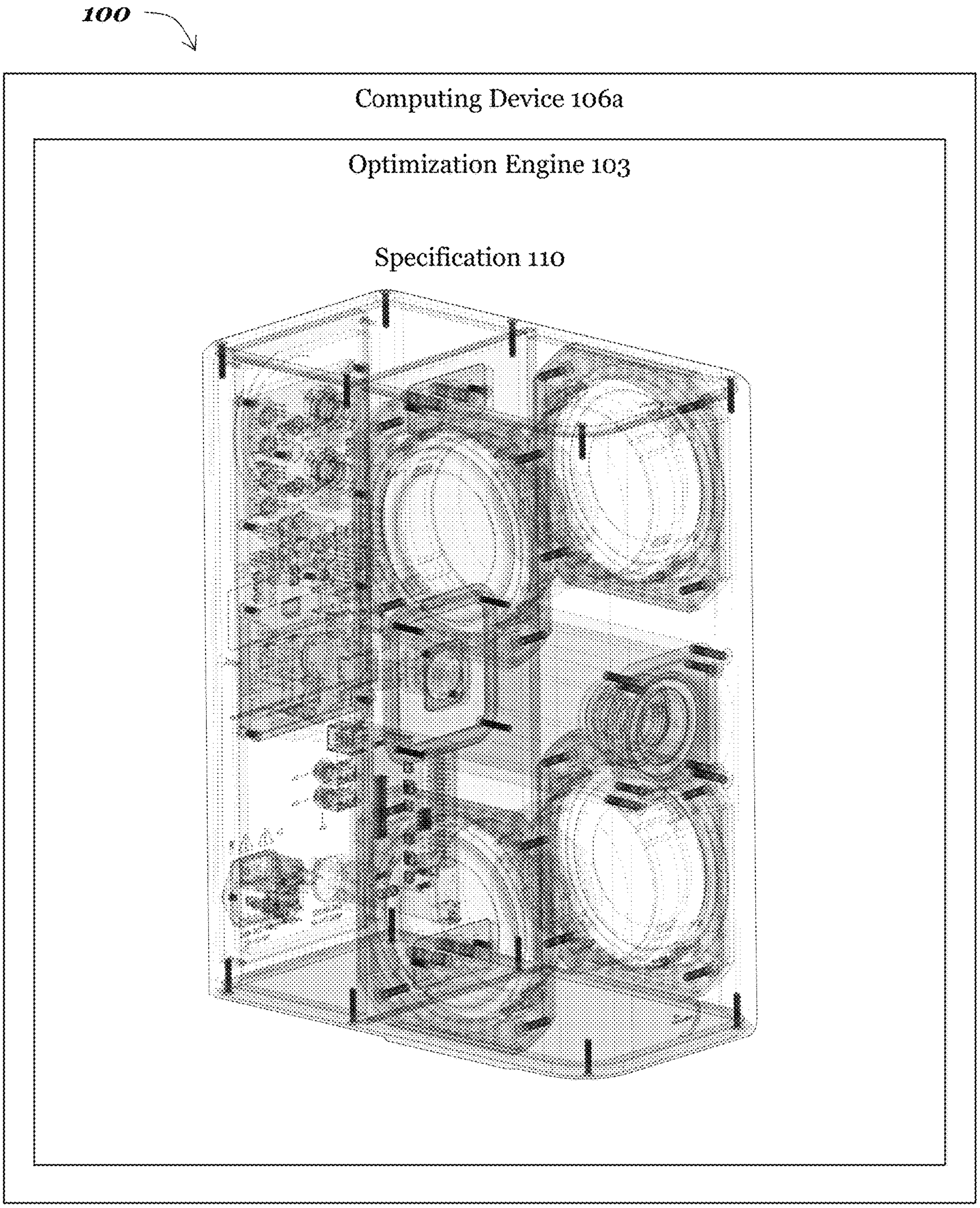
FIG. 1B is a block diagram depicting an embodiment of a system for independently optimizing linear components from non-linear components in loudspeaker design.

The following provide examples of the design specifications that the optimization engine 103 may receive for non-linear components that might result in the specification generated and displayed in FIG. 1B above. As one example, a design specification may indicate that an acoustic center of the loudspeaker shall be localized at the y-axis midpoint of a maximally narrow front baffle (accounting for manufacturing tolerances and up to 40 mm edge radii). This transducer shall be either a full range or two-way coaxial design. If this transducer cannot produce a sufficient sound pressure level at all required frequencies for the intended end use application of the loudspeaker at 2% THD or lower, it may be assisted by additional low frequency transducers. In all cases the full range or coaxial transducer must meet the application's minimum SPL requirements at ¼ maximum power or lower when crossed over to the low frequency transducers no higher in frequency than 300 hz.

As another example, a design specification may indicate that the full range or coaxial transducer shall either be self-enclosed in a sealed package, or physically isolated from the back pressure wave of the low frequency transducers via internal chambering or a separate sealed enclosure affixed to the inside of the front baffle. Additionally, the transducers shall not share an enclosure with any electronic components. In powered loudspeaker designs, a separate, internally sealed compartment shall house all electronic components, and all electrical connections between the acoustic enclosures and electronic enclosures shall be made airtight via the use of seals or gaskets.

As one example, a design specification may indicate that the crossovers shall use no shallower than 4th order and no steeper than 8th order filter slopes. All crossovers shall employ high precision digital filters, and when using a 2-way coaxial, the woofer/midrange and tweeter shall be independently powered by individual amplifier channels. For designs employing low frequency transducers, these may be connected in series and/or parallel to a single amplifier channel provided that the net impedance load is no lower than 4 ohms.

As one example, a design specification may indicate that as SPL and low frequency extension requirements necessitate, the full range or coaxial transducer shall be assisted by either two or four additional dedicated low frequency transducers. For designs intended to operate in 2pi space, such as soffit mounted loudspeakers, these transducers shall be radially equidistant from the full range or coaxial transducer on the front baffle, such that the design maintains at least theta angle axisymmetry, and shall be either inset or rear mounted using a constant radius to the front baffle to a minimum depth necessary for the apex of the driver's surround to be either co-planar with or behind the front plane of the front baffle. For designs intended to operate in 4pi space, such as free-standing bookshelf, tower or monitor loudspeakers, either two low frequency transducers shall be installed on the side baffles symmetrically along the same phi plane as the coaxial or full range transducer, or four low frequency transducers shall be installed on the side baffles, in phi angle symmetric pairs above and below the full range or coaxial transducer, with each transducer's acoustic center equidistant to the acoustic center of the full range or coaxial.

As one example, a design specification may indicate that the design shall employ no acoustic methods of back wave energy recapture, such as Helmholtz resonators, transmission lines, or passive radiators, that result in acoustic group delay or phase angle deviation relative to the front pressure wave of the affected transducer of more than 30° at any frequency.

As one example, a design specification may indicate that the transducer design and selection shall focus on distortion, SPL potential, coverage angle/off-axis power average, and eigenmode behavior exclusively. On-axis magnitude and group delay behavior shall be disregarded. The full range or coaxial transducer shall be optimized, with the use of additional acoustic lenses or waveguides if necessary, for a conical constant power directivity index (+/−3 db relative to the on axis magnitude behavior from at least 300 hz-10 khz) no narrower than 60°×60°.

As another example, a design specification may indicate that the linear behavior of the loudspeaker shall be optimized via the use of digital signal processing by an FIR filter that simultaneously controls for the magnitude and phase response of the speaker as measured prior to the addition of the FIR. The measurement shall be taken in an acoustically controlled measurement environment. The final measurement data set to be corrected can be generated as the average of a series of measurements taken at multiple points between 0° and 30° off the central axis, or taken at a single point that best fits the mean of said power average from 0° to 30°. The distance between the microphone and the acoustic center should remain constant across the multiple measurements and the distance should be chosen such that the output from the transducers in the speaker have integrated evenly into a coherent wavefront.

The optimization engine may identify a point of acoustic output of the loudspeaker system (or of a component within the loudspeaker system) at which an output of at least one transducer in the loudspeaker system satisfies a threshold level of wavefront integration.

By taking the output of driver and cabinet selection and using that output to optimize one or more linear components (such as, without limitation, the coefficients of a filter applied by a digital signal processing component to an audio stream), the method 200 may provide a customized loudspeaker system with optimal performance.

The method 200 includes defining at least one characteristic of at least one hardware component of the loudspeaker system satisfying the received identification (204).

Optimizing the linear behavior of a loudspeaker system may include characterizing the linear behavior using the impulse response of the speaker, which may capture both magnitude and timing behavior. The impulse response of a speaker represents the output of the speaker that would result from inputting a unit impulse. The impulse response may be measured by inputting a series of repeated sine sweeps that each cover the relevant frequency range of the loudspeaker system to be corrected. The acoustic output of the speaker system is captured by a microphone. From this, the transfer function (and, therefore, impulse response) can be extracted by computing the difference between the magnitude and phase of the input signal and of the captured acoustic output.

The measured magnitude and phase of the acoustic output of the loudspeaker system may be determined by both the linear behavior of the system as well as the position at which the output is captured. The distance between the point of capture and the loudspeaker may be chosen so that the output of the individual transducers in the loudspeaker system have adequately integrated into a coherent wavefront; in so choosing the system may determine to remain close to the minimum distance at which this integration is achieved as increasing the distance from that minimum may cause the measurement to be influenced by the acoustic properties of the room in which the measurement is taken. The influence of the room can also be diminished by using a hemi-anechoic or fully anechoic chamber.

The system may also consider the angle from the center axis of the speaker, i.e., from the axis through the acoustic center of the speaker perpendicular to the front baffle of the speaker. The angle formed by the line from the microphone to the acoustic center with this center axis may also have a significant impact on the measured response, as higher frequencies will have lower energy at higher angles from the center axis. The loudspeaker may be characterized by taking multiple impulse response measurements with the microphone at multiple angles from the center axis, ranging from 0° (directly on the center axis) to 30° from the center axis (in the horizontal plane, vertical plane, or in a combination thereof) while maintaining the same distance to the acoustic center and then averaging the measured impulse responses into one time domain representation of the linear behavior. The loudspeaker may also be characterized by measuring the impulse response at one angle chosen to closely track the average of the output of the speaker within 0° to 30°.

Referring now to FIG. 1B, a block diagram depicts one embodiment of a specification for a loudspeaker in a loudspeaker system generated by the optimization engine 103. In the example design shown by FIG. 1B, a full range transducer covering the 300 hz to 25 khz passband is crossed over to four small low frequency transducers using digital 8th order Linkwitz-Riley filters. The full range is acoustically isolated from the back-wave of the low frequency transducers using a square tube extrusion, which is sealed at both ends using foam gaskets. Gasket sealed electrical connections to the amplifiers are provided for the full range, top, and bottom pairs of low frequency transducers independently. The low frequency drivers are installed in symmetric pairs above and below the full range, and configured with 16 ohm voice coils, which are connected in parallel to a single amplifier channel for a net impedance load of 4 ohms. The electronics compartment houses an integrated stereo amplifier module, which also provides auxiliary power for a floating point digital signal processor and its data converters, regulators, and other surrounding circuitry. The full range is rear mounted on the inside of the front baffle, and the front baffle is machined to the geometry of an oblate spheroid conical waveguide for the full range, which helps satisfy the coverage angle requirements of the paradigm. The drivers were either designed or selected exclusively for their non-linear performance characteristics; the full range, for example, would not provide a satisfactory on-axis magnitude response for a traditional design without unique corrective digital signal processing. The onboard floating point DSP hosts a unique set of FIR coefficients to control the linear components of the loudspeaker's behavior. These coefficients compensate for the sum group delay incurred both by the physical alignment of the low frequency transducers relative to the acoustic center of the loudspeaker and the impedance curves of the driver motor structures, as well as the sum integrated magnitude linearity of the resulting hemispherical wavefront.

Referring back to FIG. 2, the method 200 includes optimizing at least one linear behavior of a loudspeaker system, wherein optimizing further comprises optimizing a finite impulse response (FIR) filter of the loudspeaker system, and wherein, combined with application of the optimized FIR filter execution of the loudspeaker system including the specified non-linear behaviors, satisfies a threshold level of performance of the loudspeaker system (206).

Optimizing the FIR filter of the loudspeaker system may include identifying at least one coefficient for use in a mathematical representation of the FIR filter including a plurality of coefficients and modifying the FIR filter to include the at least one identified coefficient. In one embodiment, with the impulse response measured as described above, the system may represent the impulse response as a vector Xm and identify a filter F that corrects the behavior of the speaker, represented in Xm. If we define Yt as the behavior of the speaker with the filter included, this is given by a convolution relation: $Yt=Xm*F$. Since Xm is a known quantity and Yt can be defined to represent the desired behavior of the overall system, this equation can be solved to produce the filter F.

The optimized FIR filter may be stored on the firmware of a loudspeaker in a loudspeaker system. A Digital Signal Processor (DSP) chip in the loudspeaker system may access the FIR filter and apply the FIR filter to the audio stream. The FIR filter may be applied to an audio stream for playback by the loudspeaker system. The FIR filter may be applied to the audio stream in real time—that is, just prior to or during the playback of the audio stream.

The FIR filter may therefore be customized for one or more loudspeakers in a loudspeaker system exhibiting one or more non-linear behaviors. Since hosting a DSP in a loudspeaker system is expensive, most loudspeakers are analog and, if a conventional loudspeaker does include a DSP, conventional loudspeakers do not include sufficient resources to customize the FIR filter(s) applied by the DSP to the audio streams and do not have the resources to do so during or prior to playback in a real time manner. Therefore, in contrast to conventional systems that do not typically even support the use of a DSP, the methods and systems described herein result in a design of a loudspeaker that is tied to, and enhanced by, the customization of a FIR filter accessed by the DSP. When the DSP applies the optimized FIR filter, the behavior of the loudspeaker system as a whole—including linear and non-linear behaviors—may provide an optimized playback experience that satisfies or exceeds expectations for one or more design specifications. In some embodiments therefore, the optimization engine 103 may generate a design for a loudspeaker system that satisfies one or more non-linear behavior specifications and which includes an optimized FIR filter accessible by a DSP in the loudspeaker system, execution of which enables optimized performance within the constraints specified by the received design specification.

The methods and systems described herein may further relate to functionality for applying filters to provide optimized perceptual rendering of audio for playback by headphones. When listening to music there is often the perception of a singer's voice coming from a center, even though the actual sound is coming from speakers or headphones. This "phantom center" is an example of "imaging," the illusion of sound coming from a source other than the actual physical transducers. Imaging is an important aspect of the experience of listening to reproduced sound, whether in music or for sound associated with visual media, such as film or television content. The perceived experience of imaging is highly dependent on the way the sound is reproduced. In particular, the imaging from speakers typically feels like it is coming from in front of the listener while the imaging from headphones often feels like it is coming from inside the listener's head. In one embodiment, the methods and systems described herein provide an approach to rendering the perceptual experience of listening in front of speakers onto headphones by modifying the audio stream with digital signal processing. This approach can be extended to recreate the experience of sound from an arbitrary collection of sources at arbitrary locations, although for simplicity the description will begin with a single source at a single location.

Figure 3:
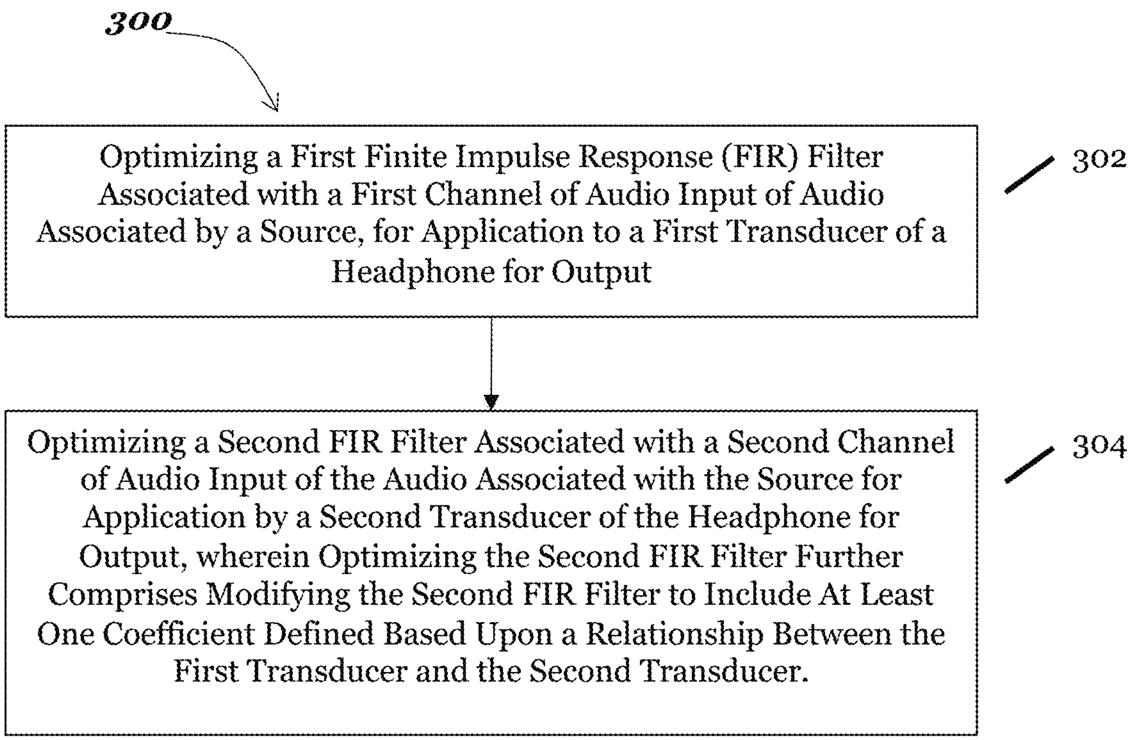
FIG. 3 is a flow diagram depicting an embodiment of a method for perceptual rendering of audio for playback by a headphone.

Referring now to FIG. 3, in brief overview, a method 300 for perceptual rendering of audio for playback by a headphone includes optimizing a first finite impulse response (FIR) filter associated with a first channel of audio input of audio associated with a source, for application to a first transducer of a headphone for output (302). The method 300 includes optimizing a second FIR filter associated with a second channel of audio input of the audio associated with the source, for application to a second transducer of the headphone for output, wherein optimizing the second FIR filter further comprises modifying the second FIR filter to include at least one coefficient defined based upon a relationship between the first transducer and a second transducer (304).

Referring now to FIG. 3, in detail and in connection with FIGS. 1A, 1B, and 2, a method 300 for perceptual rendering of audio for playback by a headphone includes optimizing a first finite impulse response (FIR) filter associated with a first channel of audio input of audio associated with a source, for application to a first transducer of a headphone for output (302).

The method 300 includes optimizing a second FIR filter associated with a second channel of audio input of the audio associated with the source, for application to a second transducer of the headphone for output, wherein optimizing the second FIR filter further comprises modifying the second FIR filter to include at least one coefficient defined based upon a relationship between the first transducer and a second transducer (304).

Optimizing the first and second FIR filters may include identifying at least one coefficient for use in a mathematical representation of the FIR filter being optimized including a plurality of coefficients. Optimizing the first and second FIR filter may include modifying the FIR filter being optimized to include the at least one identified coefficient. The optimization may occur as described above in connection with FIGS. 1A, 1B, and 2.

The first and second channel of audio input may be generated on a per-source basis.

The source may be associated with an object at an arbitrary location in space. The source may be associated with a defined audio channel in a loudspeaker system.

When sound is played back on speakers, the transducers are in front of the listener and the sound from each speaker interacts with the listener's head and reaches both ears. When the same sound is played back on headphones, the transducers are next to the ear and the sound from each side of the headphone reaches only one ear without interacting with much of the listener's head. This difference is the underlying observation to a common approach to recreating the experience of speakers on headphones. By measuring the acoustic impact of the listener's head on sound, it is possible to incorporate that effect into the audio stream before it is played back through headphones, in theory providing the same sound to the listener's ears as if the sound were coming from speakers. This measured effect is known as the Head-Related Transfer Function (HRTF) and can also be represented as a Head-Related Impulse Response (HRIR).

If the HRTF of the listener is measured exactly, the sonic illusion created by applying the measured HRTF to the audio stream would be very accurate for that listener. However, there are differences in the size and shape of each person's head and ears that significantly affect the HRTF. Thus, the HRTF that recreates an accurate experience for one listener would not be as effective for a different listener. In common deployments of HRTF-based spatial audio, a generic HRTF is available. However, if the listener's own HRTF does not closely match the generic HRTF, the imaging will not be rendered accurately. Some platforms offer the option to personalize an HRTF profile, typically requiring imaging or mapping the ears and/or head of the listener and then computing an HRTF profile from those images. The methods and systems described herein do not rely on precise matching of HRTF profiles and do not require imaging or mapping the listener's physiology.

While many conventional HRTF-based approaches to spatial audio directly convolve generic or personalized HRTFs to produce the imaging effect, the methods and systems described herein may instead rely on mathematical operations within a plurality of transfer functions describing the transfer function of a head for a sound source as a particular location; treating these functions as a group of functions under function composition allows the optimization engine 103 to express physical operations about HRTFs and to manipulate the transfer functions to optimize eventual playback. Some of the transfer functions may represent the sound propagating through air for a particular distance while other transfer functions in the group may be associated with the left or right ears at particular angles. As will be understood by those of skill in the art, due to the symmetry of the head, the HRTF is generally symmetrical in the left-right direction, such that a transfer function measured at the right ear from a sound source at a particular distance horizontally and vertically from the center axis will equal the measurement for the left at the same degrees vertically from the center axis and the same distance from the sound source but will be the opposite of the horizontal degrees (e.g., 90 degrees on the right would be −90 on the left). The optimization engine 103 may therefore specify a function that represents a difference in the sound at one ear when a sound source moves from next to the ear to a specified position and use the differences in response at the left vs. right ear to determine how to render an output stream while providing the perceptual experience of the sound coming from a sound source and moving from the left ear to the right ear. In other words, to achieve perceptual rendering, the optimization engine 103 may apply functions that represent the relationship between the elements of the HRTF group (e.g., distance from sound source, left ear and right ear as discussed above) and determine a relationship between these elements that represents sound transmitted as input to headphones that provide input to the left ear and the right ear, using the associative property of function composition to specify functions to apply to audio for each ear. Therefore, implementation of the methods and systems described herein may provide more robust rendering than that provided when using conventional HRTFs that are weakened by variations in the heads of listeners.

In some embodiments, the transfer functions in the group of transfer functions may be converted into impulse responses through the use of Fourier transforms. Since the functions for left and right ears are known impulse responses, and given the symmetrical properties of the transfer functions for the ears discussed above, the optimization engine 103 may specify a function that relates a specific location (e.g., sound source) at a particular time in terms of one ear instead of two and then represent that function as an FIR filter, identifying the coefficients as described above in connection with FIG. 2, and then do the same to identify coefficients for an FIR filter for the other ear. Since multiple FIR filters may be applied to an audio stream, the DSP may apply multiple FIR filters with optimized coefficients at the time of playback of an audio stream. By way of example and without limitation, the example above describes identifying coefficients to use in an FIR filter applied to sound played to the right ear (e.g., via a transducer on the right side of a headphone) and identifying coefficients to use in an FIR filter applied to sound played to the left ear (e.g., via a transducer on the left side of a headphone) when the sound source is at a specific distance from the headphone during a specific time series. Furthermore, since multiple FIR filters may be applied, for each additional channel of audio, the optimization engine 103 may generate FIR filters (e.g., for each of two transducers in a headphone) and the associated optimization coefficients and then direct the DSP applying the FIR filters to apply each of the generated FIR filters to an audio stream.

Therefore, the optimization engine 103 may optimize at least one coefficient of a first FIR filter associated with at least one channel of audio input to a headphone for output by a first transducer of the headphone. The optimization engine 103 may specify a relationship between playback of a sound at a particular distance (and/or degree) from a sound source by the first transducer and the playback of the sound at a distance from the sound source of a second transducer, wherein the first and second transducer have a symmetrical relationship to each other. The optimization engine 103 may then optimize at least one coefficient of a second filter associated with the at least one channel of audio input to the headphone for output by the second transducer of the headphone. The optimization engine 103 may optimize a pair of FIR filters (one for the first transducer and one for the second transducer) for each channel of audio input in an embodiment in which the audio input includes a plurality of channels. The optimization may occur as described above in connection with FIG. 2.

An FIR filter with the optimized coefficients may be applied to audio streams that were previously recorded without requiring re-recording in order to benefit from the optimizations.

An FIR filter with the optimized coefficients may be integrated into the hardware of a headphone so that the filter is applied to audio as the headphone transducers play the sound for a wearer of the headphones.

The optimization engine 103 may generate one or more FIR filters with the optimized coefficients in a scalable manner.

An FIR filter with the optimized coefficients may be integrated into a streaming audio platform; for example, as a plug-in to a distribution platform that streams audio or as a plug-in to a playback application receiving the audio stream. The application of the FIR filter with the optimized coefficients may be integrated into a processing step in a method executed in preparation of streaming audio to a recipient. As one example, a hardware accelerator may execute the functionality of the optimization engine 103. By way of example, and without limitation, the optimization engine 103 may be provided as either a standalone software program or a plug-in to existing software used by a film or music production stage; in such an example, one use case includes allowing engineers and/or producers to hear the sound the way an end user might hear the sound and make production decisions accordingly and such engineers and/or producers may hear the sound from a remote location than the production stage while needing less bandwidth than a conventional system would typically require.

The methods and systems described herein may execute to optimize FIR filters being applied during the process of audio playback by headphones as described above. The methods and systems described herein may also execute to optimize FIR filters being applied during the process of audio playback by playback speaker systems including a plurality of speakers.

Figure 4:
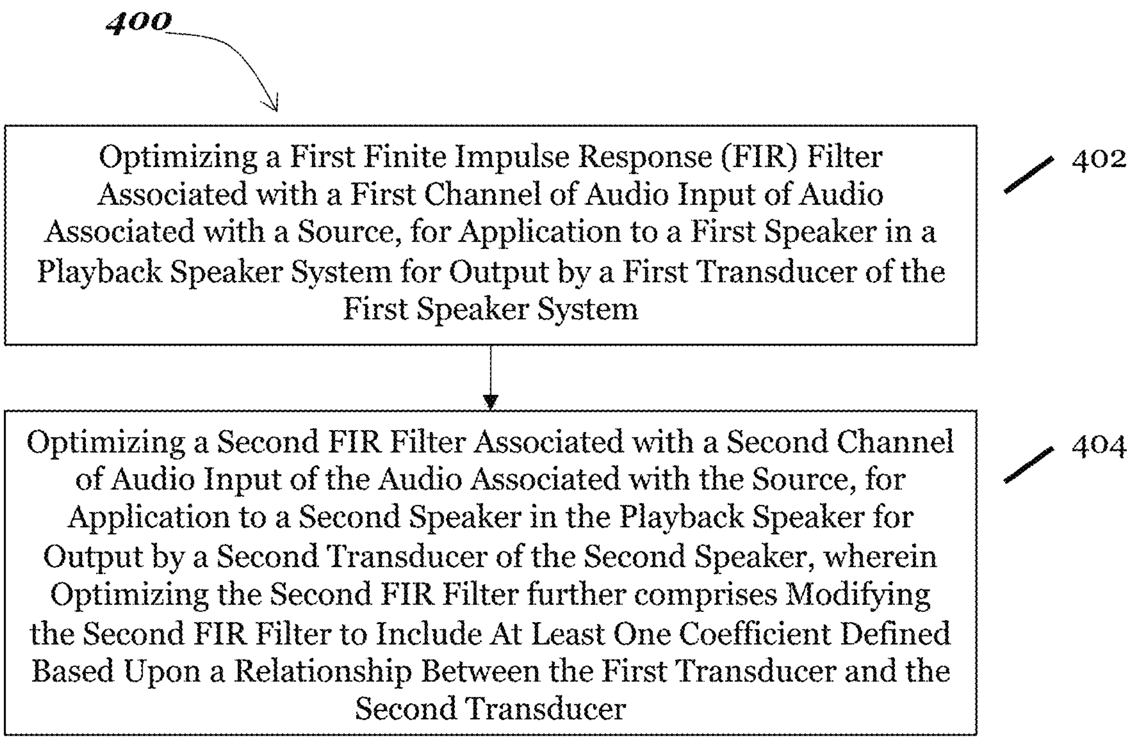
FIG. 4 is a flow diagram depicting an embodiment of a method for perceptual rendering of audio for playback by a playback speaker system.

Therefore, and referring now to FIG. 4, a method 400 for perceptual rendering of audio for playback by a playback speaker system may include optimizing a first finite impulse response (FIR) filter associated with a first channel of audio input of audio associated with a source, for application to a first speaker in a playback speaker system for output by a first transducer of the first speaker (402). The method 400 may include optimizing a second finite impulse response (FIR) filter associated with a second channel of audio input of the audio associated with the source, for application to a second speaker in the playback speaker for output by at least one transducer of the second speaker, wherein optimizing the second FIR filter further comprises modifying the second FIR filter to include at least one coefficient defined based upon a relationship between the first transducer and a second transducer (404). The optimization of the first and second FIR filters may occur as described above in connection with FIGS. 1-3.

In the context of audio processing generally, and including in the context of perceptual rendering and the group of HRTFs, functions may be represented as filters and function composition may be represented as convolution. The precise behavior of the filters may be fully described in both the time domain, as an impulse response, i.e., with the coefficients of an FIR filter, or in the frequency domain, as the combined magnitude and phase response of the filter. In the context of perceptual rendering, or audio processing in general, it may be desirable to derive filters that have a particular phase response with controlled and/or mitigated magnitude response, or vice versa. For perceptual rendering, this is particularly important as the phase behavior is necessary for the effect of imaging and spatialization, while excessive magnitude deviations can detract from the listener experience. Therefore, the methods and systems described herein may include functionality for separating the phase and magnitude behavior of a function represented by an FIR filter, yielding a filter that matches or approximates the phase response of the original filter with controlled and/or mitigated magnitude response. The approach may also be used to yield a filter that matches or approximates the magnitude response of the original filter with controlled and/or mitigated phase response.

Filters and functions are equivalently represented in either the frequency domain or time domain, and operations in one domain correspond to operations in the other. For a filter A with the time domain representation $A_t$, there is a corresponding frequency domain representation. For simplicity, consider the frequency domain representation of A as the ordered pair of its magnitude and phase responses, $(\mu_A, \phi_A)$. A filter with the frequency domain representation (0,0) would have no impact on either magnitude or phase, i.e., it would be a Dirac impulse.

Convolution in the time domain corresponds to addition in the frequency domain. That is, for filters B and C=A*B then:

$$\mu_C = \mu_A + \mu_B \qquad (1)$$
$$\phi_C = \phi_A + \phi_B$$

Another operation that the system may execute, especially on FIR filters, is time reversal. Reversal in the time domain corresponds to inverting the phase response in the frequency domain, while magnitude response is unchanged. So, if $\overline{A}$ is the time reverse of A, then:

$$\mu_{\overline{A}} = \mu_A \qquad (2)$$
$$\phi_{\overline{A}} - \phi_A$$

With these two operations, the system may convolve A with $\hat{A}$ to partially isolate the magnitude behavior in a new filter, $M^2_A$:

$$M_A^2 = A * \overline{A} \qquad (3)$$
$$\mu_{M_A^2} = \mu_A + \mu_{\overline{A}} = 2\mu_A$$
$$\phi_{M_A^2} = \phi_A + \phi_{\overline{A}} = 0$$

This results in a filter $M^2_A$ with the frequency domain representation $(2\mu_A, 0)$. The system may apply this filter in embodiments in which the magnitude response of A represents an effect that can be applied repeatedly, such as the attenuation characteristics of an acoustic treatment. In that case, $M^2_A$ represents the effect on magnitude of two "layers" of said treatment, without the phase influence that may be introduced by the treatment or by the process of measuring the response of the treatment. $M^2_A$ may also be further processed as described in further detail below to identify a filter MA with the frequency domain representation $(\mu_A, 0)$.

While time reversal may invert the phase response without affecting the magnitude response, different approaches are described herein to invert the magnitude response without affecting the phase response. In one embodiment, an approach to invert a magnitude response without affecting a phase response includes reverse derivation. As an example, in a case of perceptual rendering, if the filter A represents the difference between two functions, $H_1$ and $H_2$, $H_1$ may represent behavior of a transducer in a playback system and $H_2$ may represent behavior of an input source. If A is derived such that $H_1*A=H_2$ then the system can similarly derive B such that $H_2*B=H_1$. By substitution, $H_1*A*B=H_1$ and therefore $B=A^{-1}$, i.e., $$\mu_B = -\mu_A \quad (4)$$

$$\phi_B = -\phi_A$$

Taking the time reversal of B results in $\overline{B}$, with the corresponding frequency domain representation $(\mu_B, -\phi_B) = -\mu_A, \phi_A)$. Convolving A with B yields a filter $P^2_A$ with a frequency response $(0, 2\phi_A)$. In one embodiment, an approach to invert a magnitude response without affecting a phase response filter inversion. Using the filter A as in the example above, the system may directly derive the corresponding filter B from the filter A without revising the underlying functions $H_1$ and $H_2$. As indicated above, a filter with a frequency response (0,0) is a Dirac impulse, which may be referred to in the time domain as $I_d$. With a known filter A, the system may derive B such that $A*B=I_d$, which would yield B with the same frequency response as above, and subsequently time reverse the frequency response to yield B and then filter $P^2_A$. This approach may also or alternatively be executed to introduce a desired magnitude response. The Dirac impulse contains all frequencies at the equal magnitude and phase. To identify an impulse response that contains only frequencies up to a specified upper limit, that impulse response may be represented by a (windowed) sine function, which may be referred to as $I_s$. The corresponding magnitude response is a rectangular function (0 within the band, $-\infty$ outside the band), while the phase response remains 0: (rect, 0). Then deriving a filter C such that $A*C=I_s$, results in the filter C having a frequency response $(\text{rect}-\mu_A, -\phi_A)$. Taking the time reverse of C and convolving with A yields $R^2_A$ with the frequency response $(\text{rect}, 2\phi_A)$.

As with the double magnitude filter $M^2_A$, a double phase filter $P^2_A$ and/or $R^2_A$ may be applied if they represent a stackable effect. When the underlying functions $H_1$ and $H_2$ represent a signal having propagated through space a certain distance d, a resulting filter A represents the effect of that distance d on a signal. The double phase filters $P^2_A$ and/or $R^2_A$ may therefore represent a phase effect of a distance 2*d* with either minimal magnitude behavior, in the case of $P^2_A$, or defined and controlled magnitude behavior, in the case of $R^2_A$. These filters can also be applied multiple times to further multiply the distance represented, i.e., applying $P^2_A$ and/or $R^2_A$ n times represents the phase effect of sound propagating through air for a distance of n*2d. Such filters may be applied in perceptual rendering for a controllable distance parameter.

In some embodiments, to produce a filter that reflects only one instance of the phase or magnitude response of the original, the system executes a convolutional root. Since convolution in the time domain corresponds to addition in the frequency domain, convolving a filter with itself produces a filter with double the phase and magnitude response. The system may isolate a desired filter by convolving a filter with itself. Generalizing to filters F and G such that G*G=F, with a known F, the system may apply numerical estimation methods, including, without limitation, gradient descent based approaches, genetic/evolutionary algorithms, and general Monte Carlo methods, to solve for an approximation of G. When F is $P^2_A$ with a frequency response $(0, 2\phi_A)$, the resulting estimate of G would be PA with approximately the frequency response $(0, \phi_A)$. If F is $M^2_A$, the system may generate an estimate for MA with approximate frequency response $(\mu_A, 0)$. Because the rectangular function is negative outside the desired band and 0 within the desired band, rect/2=rect and the same process may be used to derive filter $R_A$ with frequency response $(\text{rect}, \mu_A)$ from $R^2_A$.

The above approaches to isolating phase may be used with an arbitrary target response. One approach to generating such a target response in an impulse is to use zero-phase filtering. Beginning with the Dirac impulse $I_d$ and a set of IIR filters $F_1, F_2, \ldots, F_n$, the system may apply each filter $F_i$ to the impulse $I_d$ twice, once in the forward time direction and once in the reverse time direction, to embed twice the magnitude response of $F_i$ in the impulse and cancel out the phase response, so that the resulting filtered impulse $I_a$ has a magnitude response that is double the filter's $F_i$ and zero phase. The same zero-phase filtering process can be applied to the representation of $H_1$ in the reverse derivation method for isolating phase to introduce the intended magnitude response. In both the filter inversion and reverse derivation approaches, the zero-phase filtering process can be applied instead to the $P^2_A$ filter prior to taking the convolutional root. The selection of the filters $F_i$ allows for arbitrary magnitude response in the resulting filter. Note that since the magnitude is doubled by the zero-phase technique defining the target impulse and then halved again by the convolutional root, the resulting output filter has approximately the same magnitude response collectively introduced by the filters. This is a more generalized and flexible form of the process. The sinc target can be considered a special case of the arbitrary magnitude target where the filters $F_1, \ldots, F_n$ collectively represent an ideal "brick wall" filter at the cutoff frequency. The target response can also be modified with a series of all-pass filters to introduce desired phase behavior into the resulting FIR. In conjunction with the application of zero-phase filters, the system may achieve an arbitrarily defined phase and magnitude behavior.

As will be understood by those of skill in the art, perceptual rendering typically depends on the accuracy of empirical data. By deriving measurements as described above, the system may use the functionality described above to (i) identify magnitude and/or phase components and (ii) modify one or more FIR filters to identify, account for, and remove the identified components that detract from a level of quality of the audio. Therefore, the methods described herein may include a method for rendering of audio for playback by an output device, the method including optimizing a first FIR filter associated with a first channel of audio input of audio associated with a source, for application to a first transducer of an output device; optimizing a second FIR filter associated with a second channel of audio input of the audio associated with the source, for application to a second transducer of the output device, wherein optimizing the second FIR filter further comprises modifying the second FIR filter to include at least one coefficient defined based upon a relationship between the first transducer and a second transducer; and modifying the first FIR filter, wherein the modifying includes applying an inverse of the first FIR filter to the first FIR filter to modify a magnitude component of the first FIR filter. Modifying the magnitude component may include removing the magnitude component. Modifying the magnitude component may include isolating the magnitude component.

The methods described herein may further include a method for rendering of audio for playback by an output device, the method including optimizing a first FIR filter associated with a first channel of audio input of audio associated with a source, for application to a first transducer of an output device; optimizing a second FIR filter associated with a second channel of audio input of the audio associated with the source, for application to a second transducer of the output device, wherein optimizing the second FIR filter further comprises modifying the second FIR filter to include at least one coefficient defined based upon a relationship between the first transducer and a second transducer; and modifying the second FIR filter, wherein the modifying includes applying an inverse of the second FIR filter to the second FIR filter to modify a magnitude component of the second FIR filter. Modifying the magnitude component may include removing the magnitude component. Modifying the magnitude component may include isolating the magnitude component.

Similarly, a method for rendering of audio for playback by an output device may include optimizing a first FIR filter associated with a first channel of audio input of audio associated with a source, for application to a first transducer of an output device; optimizing a second FIR filter associated with a second channel of audio input of the audio associated with the source, for application to a second transducer of the output device, wherein optimizing the second FIR filter further comprises modifying the second FIR filter to include at least one coefficient defined based upon a relationship between the first transducer and a second transducer; and modifying the second FIR filter, wherein the modifying includes applying a derivative of the second FIR filter to the second FIR filter to modify a phase component of the second FIR filter. A method for perceptual rendering of audio for playback by an output device may include optimizing a first FIR filter associated with a first channel of audio input of audio associated with a source, for application to a first transducer of an output device; optimizing a second FIR filter associated with a second channel of audio input of the audio associated with the source, for application to a second transducer of the output device, wherein optimizing the second FIR filter further comprises modifying the second FIR filter to include at least one coefficient defined based upon a relationship between the first transducer and a second transducer; and modifying the first FIR filter, wherein the modifying includes applying a derivative of the first FIR filter to the first FIR filter to modify a phase component of the first FIR filter. Modifying the phase component may include removing the magnitude component. Modifying the phase component may include isolating the magnitude component.

The methods described herein may further include a method for rendering of audio for playback by an output device, regardless of whether the rendering is perceptual rendering or another type of rendering. Therefore, the method for rendering may include optimizing a first FIR filter associated with a first channel of audio input of audio associated with a source, for application to a first transducer of an output device; optimizing a second FIR filter associated with a second channel of audio input of the audio associated with the source, for application to a second transducer of the output device, wherein optimizing the second FIR filter further comprises modifying the second FIR filter to include at least one coefficient defined based upon a relationship between the first transducer and a second transducer; and modifying the second FIR filter, wherein the modifying includes applying an inverse of the second FIR filter to the second FIR filter to modify a magnitude component of the second FIR filter. Modifying the magnitude component may include removing the magnitude component. Modifying the magnitude component may include isolating the magnitude component. The methods described herein may include a method for rendering of audio for playback by an output device, the method including optimizing a first FIR filter associated with a first channel of audio input of audio associated with a source, for application to a first transducer of an output device; optimizing a second FIR filter associated with a second channel of audio input of the audio associated with the source, for application to a second transducer of the output device, wherein optimizing the second FIR filter further comprises modifying the second FIR filter to include at least one coefficient defined based upon a relationship between the first transducer and a second transducer; and modifying the first FIR filter, wherein the modifying includes applying an inverse of the first FIR filter to the first FIR filter to modify a magnitude component of the first FIR filter. Similarly, a method for rendering of audio for playback by an output device (which need not be perceptual rendering) may include optimizing a first finite impulse response (FIR) filter associated with a first channel of audio input of audio associated with a source, for application to a first transducer of an output device; optimizing a second FIR filter associated with a second channel of audio input of the audio associated with the source, for application to a second transducer of the output device, wherein optimizing the second FIR filter further comprises modifying the second FIR filter to include at least one coefficient defined based upon a relationship between the first transducer and a second transducer; and modifying the second FIR filter, wherein the modifying includes applying a derivative of the second FIR filter to the second FIR filter to modify a phase component of the second FIR filter. A method for rendering of audio for playback by an output device (again, without regard for whether the rendering is perceptual rendering) may include optimizing a first finite impulse response (FIR) filter associated with a first channel of audio input of audio associated with a source, for application to a first transducer of an output device; optimizing a second FIR filter associated with a second channel of audio input of the audio associated with the source, for application to a second transducer of the output device, wherein optimizing the second FIR filter further comprises modifying the second FIR filter to include at least one coefficient defined based upon a relationship between the first transducer and a second transducer; and modifying the first FIR filter, wherein the modifying includes applying a derivative of the first FIR filter to the first FIR filter to modify a phase component of the first FIR filter. Modifying the phase component may include removing the magnitude component. Modifying the phase component may include isolating the magnitude component.

Therefore, a method for perceptual rendering of audio for playback by at least one speaker in an automotive audio playback system may include optimizing a first finite impulse response (FIR) filter associated with a first channel of audio input of audio associated with a source, for application to a first speaker in an automotive audio playback system for output by a first transducer of the first speaker. The method may include optimizing a second finite impulse response (FIR) filter associated with a second channel of audio input of the audio associated with the source, for application to a second speaker in the automotive audio playback system for output by at least one transducer of the second speaker, wherein optimizing the second FIR filter further comprises modifying the second FIR filter to include at least one coefficient defined based upon a relationship between the first transducer and a second transducer.

As described herein, filters and functions may be derived based on intended relationships. The system may select one of a plurality of methods and identify one or more solutions or approximate solutions in a time efficient manner. Unless specifically stated otherwise, an approximate solution or representation is acceptable for any part of the described processes.

Therefore, the methods and systems described herein provide functionality for improving the perceptual experience of listening to audio by reproducing sound from each of one or more sound sources differently through the application of different filters having optimized coefficients for playback from different transducers. The methods and systems described herein may provide functionality for improving the perceptual experience of listening to audio in gaming and virtual and/or augmented reality applications.

In some embodiments, the system 100 includes non-transitory, computer-readable medium comprising computer program instructions tangibly stored on the non-transitory computer-readable medium, wherein the instructions are executable by at least one processor to perform each of the steps of the methods described above.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment. However, the scope of protection is defined by the appended claims; the embodiments mentioned herein provide examples.

The terms "A or B", "at least one of A or/and B", "at least one of A and B", "at least one of A or B", or "one or more of A or/and B" used in the various embodiments of the present disclosure include any and all combinations of words enumerated with it. For example, "A or B", "at least one of A and B" or "at least one of A or B" may mean (1) including at least one A, (2) including at least one B, (3) including either A or B, or (4) including both at least one A and at least one B.

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

Although terms such as "optimize" and "optimal" may be used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, Python, Rust, Go, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Having described certain embodiments of methods and systems for independently optimizing linear components from non-linear components in loudspeaker systems and for perceptual rendering of audio for playback, it will be apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for perceptual rendering of audio for playback by at least one speaker in an automotive audio playback system, the method comprising:

optimizing a first finite impulse response (FIR) filter associated with a first channel of audio input of audio associated with a source, for application to a first transducer of a speaker in an automotive audio playback system for output; and optimizing a second FIR filter associated with a second channel of audio input of the audio associated with the source, for application to a second transducer of the speaker for output, wherein optimizing the second FIR filter further comprises modifying the second FIR filter to include at least one coefficient defined based upon a relationship between the first transducer and a second transducer, wherein the modifying includes applying a derivative of the second FIR filter to the second FIR filter to modify a phase component of the second FIR filter.

2. The method of claim 1, wherein optimizing the first FIR filter further comprises:

identifying at least one coefficient for use in a mathematical representation of the first FIR filter including a plurality of coefficients; and modifying the first FIR filter to include the at least one identified coefficient.

3. The method of claim 1, wherein the first and the second channel of audio input are generated on a per-source basis.

4. The method of claim 1, wherein the source is associated with an object at an arbitrary location in space.

5. The method of claim 1, wherein the source is associated with a defined audio channel in the automotive audio playback system.

6. The method of claim 1 further comprising modifying the first FIR filter, wherein the modifying includes applying an inverse of the first FIR filter to the first FIR filter to modify a magnitude component of the first FIR filter.

7. The method of claim 1 further comprising modifying the second FIR filter, wherein the modifying includes applying an inverse of the second FIR filter to the second FIR filter to modify a magnitude component of the second FIR filter.

8. The method of claim 1 further comprising modifying the first FIR filter, wherein the modifying includes applying a derivative of the first FIR filter to the first FIR filter to modify a phase component of the first FIR filter.

9. A method for perceptual rendering of audio for playback by a speaker in an automotive audio playback system, the method comprising:

optimizing a first finite impulse response (FIR) filter associated with a first channel of audio input of audio associated with a source, for application to a first speaker in an automotive audio playback system for output by a first transducer of the first speaker; and optimizing a second finite impulse response (FIR) filter associated with a second channel of audio input of the audio associated with the source, for application to a second speaker in the automotive audio playback system for output by at least one transducer of the second speaker, wherein optimizing the second FIR filter further comprises modifying the second FIR filter to include at least one coefficient defined based upon a relationship between the first transducer and a second transducer, wherein the modifying includes applying a derivative of the second FIR filter to the second FIR filter to modify a phase component of the second FIR filter.

10. The method of claim 9 further comprising:

optimizing a third finite impulse response (FIR) filter associated with a third channel of audio input of the audio associated with the source to a third speaker in the automotive audio playback system for output by at least one transducer of the third speaker, wherein optimizing the third FIR filter further comprises modifying the third FIR filter to include at least one coefficient defined based upon a relationship between the first transducer and the second transducer and a third transducer.

11. The method of claim 9, wherein the first and second channel of audio input are generated on a per-source basis.

12. The method of claim 9, wherein the source is associated with an object at an arbitrary location in space.

13. The method of claim 9, wherein the source is associated with a defined audio channel in the automotive audio playback system.

14. The method of claim 9 further comprising modifying the first FIR filter, wherein the modifying includes applying an inverse of the first FIR filter to the first FIR filter to modify a magnitude component of the first FIR filter.

15. The method of claim 9 further comprising modifying the second FIR filter, wherein the modifying includes applying an inverse of the second FIR filter to the second FIR filter to modify a magnitude component of the second FIR filter.

16. The method of claim 9 further comprising modifying the first FIR filter, wherein the modifying includes applying a derivative of the first FIR filter to the first FIR filter to modify a phase component of the first FIR filter.

* * * * *